No. 741,535. PATENTED OCT. 13, 1903.
E. NIGGLI.
CHEESE CUTTER.
APPLICATION FILED JUNE 17, 1903.
NO MODEL.
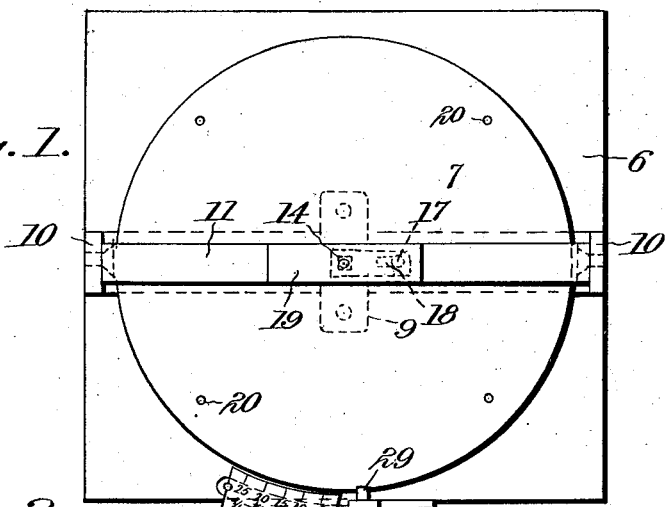
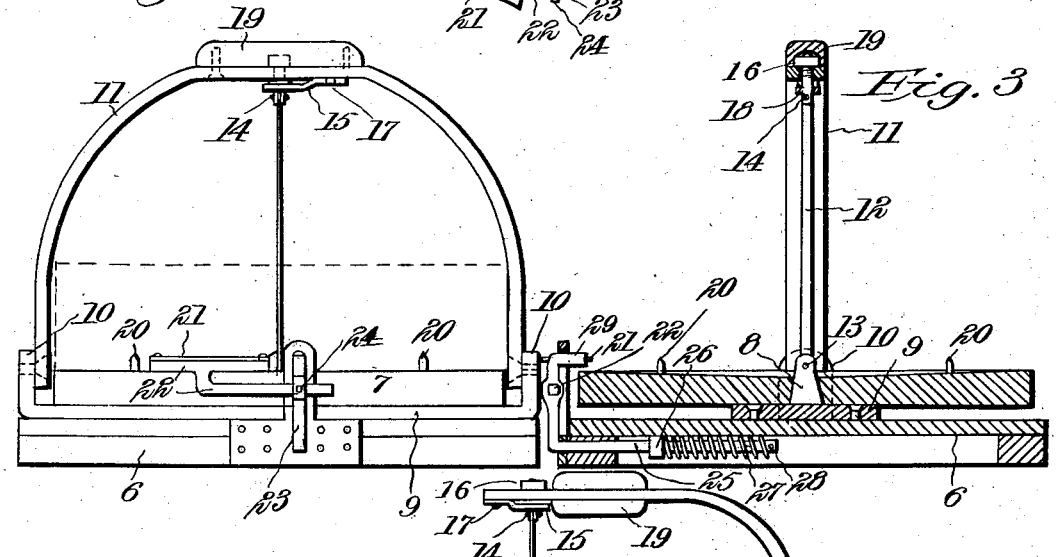
Witnesses
C. H. Walker
Geo. E. Few
Inventor
Emil Niggli
By
Nilo B. Stevens & Co
Attorneys No. 741,535. Patented October 13, 1903.

UNITED STATES PATENT OFFICE.

EMIL NIGGLI, OF SAN ANTONIO, TEXAS.

CHEESE-CUTTER.

SPECIFICATION forming part of Letters Patent No. 741,535, dated October 13, 1903.

Application filed June 17, 1903. Serial No. 161,851. (No model.)

*To all whom it may concern:*

Be it known that I, EMIL NIGGLI, a citizen of the United States, residing at San Antonio, in the county of Bexar and State of Texas, have invented new and useful Improvements in Cheese-Cutters, of which the following is a specification.

This invention relates particularly to that class of cheese-cutters in which the cheese is supported on a rotary platform and which have a scale-plate to indicate the amount of cheese to be cut.

The invention is characterized by an improved construction with respect to the knife which cuts the cheese and also with respect to the supports for the scale-plate which measures it.

Referring to the accompanying drawings, Figure 1 is a plan view of the invention. Fig. 2 is a front elevation. Fig. 3 is a vertical cross-section, and Fig. 4 is a cross-section of a modification in which the knife instead of being supported by a bow is carried by a single arm.

Referring specifically to the drawings, 6 indicates a stationary base on which is mounted a rotary platform 7, which turns on a center pin 8, projecting upwardly from a casting 9, which extends diametrically across the platform and terminates at opposite ends in upwardly-projecting ears 10, to which the knife-bow 11 is pivoted. The bow is of sufficient size to span the cheese and swings in either direction. The knife is indicated at 12, comprising, preferably, a narrow strip of steel sharpened on both edges and is connected at its inner end by a pin 13 between ears on top of the center pin 8. Its outer end is pinned to a bolt 14, which is squared where it extends through a hole in an adjusting-plate 15. The bolt extends loosely through a hole in the bow and has a nut 16, whereby the knife may be stretched. The plate 15 is attached to the bow by a screw 17, which extends through a slot 18 in the plate. The plate may thus be adjusted laterally to bring the knife to a right position to contact with the platform along its entire length and completely sever the cut of cheese when the knife is lowered. The bow is provided with a wooden handle 19 and the platform with a number of pins 20, which enter the cheese when it is placed on the platform and prevent relative movement.

The reversible scale-plate (indicated at 21) is carried by an arm 22, which extends through a hole in the vertical portion 23 of an angular supporting-bar, to which it is fixed by a set-screw 24. The angular supporting-bar for the scale-plate just referred to is movable radially with respect to the platform to accommodate the scale-plate to cheese of different sizes in much the same manner as indicated in my Patent No. 701,924, issued June 10, 1902. The bar has a horizontal portion 25, which extends under the platform through a guide 26, against which bears one end of a spring 27, the other end being held by a pin 28 in the inner end of the bar, so that the spring is in compression, tending to force the bar inwardly. The outer end of the horizontal portion 25 joins the vertical portion 23, which carries the arm of the scale-plate, as above described, and at the top the vertical portion is joined to the inwardly-extending horizontal portion 29, the end of which bears against the side of the cheese at all times. The knife comes down between the part 29 and the scale-plate.

In the modification shown in Fig. 4 the knife is carried by a single arm or half-bow 11ª, which is pivoted with a wide bearing against an ear 10ª, projecting at the edge of the platform from the casting 9. The knife is adjusted and stretched in the same manner as in the other construction.

In use the knife is first brought down against the platform and the whole cheese placed and centered thereon. Then the cheese is held down and the knife lifted, making the first cut to the center of the cheese, after which the cheese may be turned to cut off slices as desired. The knife-plate is preferably only three-sixteenths of an inch wide and will turn in the cheese without twisting at the first cut. The scale-plate forms a guide to regulate the amount of cheese in the same manner as described in my former patent.

What I claim as new, and desire to secure by Letters Patent, is—

1. In a cheese-cutter, in combination, a stationary base having an upwardly-projecting ear at the side, a rotatable platform thereon, a pin projecting from the base through the center of the platform and on which the platform rotates, a swinging knife-support pivoted to the ear beside the platform and extending over the latter, and a knife connected to the support and to the top of the pin.

2. In a cheese-cutter, in combination, a stationary base having a central pin and diametrically opposite ears, projecting upwardly therefrom, a platform rotatable on the pin, between the ears, a bow pivoted at its ends to the ears, and a knife connected to the pin in the middle of the bow.

3. In a cheese-cutter, the combination with a platform and a swinging knife connected at the center thereof, of a bow pivoted beside the platform, a tension-screw carried by the bow and connected to the outer end of the knife, and an adjustable guide for the screw, attached to the bow.

In testimony whereof I have signed my name to this specification in the presence of two subscribing witnesses.

EMIL NIGGLI.

Witnesses:
SOLON STEWART,
WILL A. MORRISS.